(12) United States Patent
Rohrbach et al.

(10) Patent No.: US 7,575,688 B2
(45) Date of Patent: Aug. 18, 2009

(54) APPARATUS AND METHOD FOR REMOVING SULFUR CONTAINING COMPOUNDS FROM A POST-REFINERY FUEL STREAM

(75) Inventors: Ronald P. Rohrbach, Flemington, NJ (US); Gary B. Zulauf, Findlay, OH (US); Peter D. Unger, Convent Station, NJ (US); Daniel E. Bause, Flanders, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/674,913

(22) Filed: Feb. 14, 2007

(65) Prior Publication Data

US 2007/0189939 A1    Aug. 16, 2007

Related U.S. Application Data

(60) Provisional application No. 60/773,811, filed on Feb. 15, 2006, provisional application No. 60/553,225, filed on Mar. 15, 2004.

(51) Int. Cl.
  *B01D 15/00* (2006.01)
  *B01D 15/04* (2006.01)
  *C02F 1/26* (2006.01)
  *B01J 8/02* (2006.01)

(52) U.S. Cl. .............. 210/660; 210/679; 210/633; 210/634; 422/211; 422/212; 422/218; 422/222

(58) Field of Classification Search ........... 210/633, 210/634, 644, 648, 649, 650, 651, 660, 670, 210/671, 672, 673, 679, 681; 422/211, 212, 422/213, 218, 222, 236, 238, 239; 123/434
See application file for complete search history.

(56) References Cited

U.S. PATENT DOCUMENTS

| 5,454,933 | A | | 10/1995 | Savage et al. |
|---|---|---|---|---|
| 6,129,835 | A | * | 10/2000 | Lesieur et al. .......... 208/208 R |
| 6,533,924 | B1 | | 3/2003 | Lesieur et al. |
| 6,733,657 | B2 | * | 5/2004 | Benazzi et al. ............... 208/110 |
| 6,749,754 | B1 | * | 6/2004 | Holder et al. ................ 210/601 |
| 6,887,381 | B2 | * | 5/2005 | Rohrbach et al. ......... 210/502.1 |
| 2001/0029311 | A1 | * | 10/2001 | Khare ......................... 585/826 |
| 2001/0035006 | A1 | | 11/2001 | Dou et al. |
| 2002/0028505 | A1 | | 3/2002 | Sakai et al. |
| 2002/0160911 | A1 | * | 10/2002 | Benazzi et al. ............... 502/240 |
| 2003/0070990 | A1 | * | 4/2003 | Rohrbach et al. ........... 210/668 |
| 2004/0063576 | A1 | * | 4/2004 | Weston et al. ................ 502/250 |
| 2004/0065003 | A1 | * | 4/2004 | O'Rear ......................... 44/389 |
| 2004/0118749 | A1 | * | 6/2004 | Lesemann et al. ............ 208/211 |
| 2004/0232047 | A1 | * | 11/2004 | Benazzi et al. ............ 208/111.3 |
| 2005/0016927 | A1 | * | 1/2005 | Rohrbach et al. ............ 210/665 |
| 2005/0236334 | A1 | * | 10/2005 | Rohrbach et al. ............ 210/660 |
| 2006/0144761 | A1 | * | 7/2006 | Keckler et al. .......... 208/208 R |
| 2006/0201145 | A1 | * | 9/2006 | Brady ............................ 60/310 |
| 2006/0218904 | A1 | * | 10/2006 | Brady ............................ 60/297 |

FOREIGN PATENT DOCUMENTS

| DE | 19845397 A1 | | 10/1998 |
|---|---|---|---|
| EP | 1550505 A1 | | 7/2005 |
| WO | WO01/32304 A1 | | 5/2001 |
| WO | WO 2004022224 A1 | * | 3/2004 |
| WO | WO2005/007780 A2 | | 1/2005 |

OTHER PUBLICATIONS

Written Opinion of the International Searching Authority dated Sep. 27, 2007 for PCT/US2007/003891.
International Search Report dated Sep. 27, 2007 for PCT/US2007/003891.

* cited by examiner

*Primary Examiner*—Walter D Griffin
*Assistant Examiner*—Huy-Tram Nguyen
(74) *Attorney, Agent, or Firm*—Cantor Colburn LLP.

(57) ABSTRACT

Disclosed are fuel filters and process for removing sulfur-containing compounds from a post refinery fuel stream. In one embodiment, the disclosed process requires passing the post refinery fuel stream through a fuel filter to provide a clean fuel stream having a reduced concentration of sulfur-containing compounds relative to the post-refinery fuel stream, wherein the fuel filter comprises an adsorbent comprising an inorganic oxide having a surface acidity characterized by a $pK_a$ of less than or equal to −3.

22 Claims, 5 Drawing Sheets

(i)

(ii)

(i)

(ii)

APPARATUS AND METHOD FOR REMOVING SULFUR CONTAINING COMPOUNDS FROM A POST-REFINERY FUEL STREAM

CROSS REFERENCE TO RELATED APPLICATIONS

This application claims the benefit of U.S. Provisional Patent Application Ser. No. 60/773,811, filed Feb. 15, 2006.

This application claims the benefit of U.S. patent application Ser. No. 11/081,796, filed Mar. 15, 2005, and entitled APPARATUS AND METHOD FOR STORING AND RELEASING SULFUR CONTAINING AROMATIC COMPOUNDS FROM A FUEL STREAM OF AN INTERNAL COMBUSTION ENGINE, which claims the benefit of U.S. Provisional Patent Application Ser. No. 60/553,225 filed Mar. 15, 2004, the contents of both of which are incorporated herein by reference thereto.

STATEMENT REGARDING FEDERALLY SPONSORED RESEARCH OR DEVELOPMENT

Embodiments of this invention may have been made with governmental support under Contract No. DE-FC26-02NT41219. Therefore, the U.S. Government may have a paid-up license to portions or embodiments of this invention and the right in limited circumstances to require the patent owner to license to others on reasonable terms as provided for by the terms of, Contract No. DE-FC26-02NT41219.

TECHNICAL FIELD

The present invention relates to a fuel filter and method for the removal of sulfur containing compounds from a post-refinery fuel stream. More particularly, the disclosed inventions provide for the production of fuel streams having concentrations of sulfur containing compounds of no more than 3 ppm.

BACKGROUND

There continues to be environmental concern relating to air pollution stemming from use of internal combustion engines, especially those used in transportation applications such as cars, trucks, boats and the like, and stationary power sources such as diesel generators and the like. In addition to being a direct source of pollution in the form of $SO_x$, sulfur also poisons the catalytic surface of exhaust after treatment devices. By reducing sulfur in the fuel and therefore the exhaust, the useful life of exhaust after treatment devices is extended.

New power sources such as fuel cells will also require fuel streams to have similar or lower levels of sulfur. Fuel cells burn hydrogen that has been reformed from various hydrocarbon fuels, such as gasoline. Sulfur will poison the active surfaces of the fuel cell, thus shortening its life.

As a result, various governments and regulatory bodies continue to enact legislation intended to substantially lower the acceptable levels of sulfur and sulfur containing compounds present in the fuels used in internal combustion engines.

The U.S. EPA, for instance, has enacted regulations requiring diesel fuel producers to phase in the production of low sulfur diesel fuel (equal to or less than 15 ppm sulfur) beginning in 2006 and ending in 2010. Similarly, from 2004 to 2006, gasoline sulfur levels were reduced from 50 ppm to 30 ppm.

The need for commercially available fuels having continually lower levels of sulfur containing compounds creates new problems for the manufacturers, of such fuels, i.e., the refining industry as well as the distributors and direct sellers of commercial fuels. In some cases, the refining industry may be unable to provide post refinery fuels having levels of sulfur containing compounds in accordance with recently enacted legislation. In other cases, a refinery may have produced fuel that was initially at an acceptable level but which subsequently became contaminated at some point enroute to the distributor and/or direct seller. In all such cases, the commercially available fuel feedstock may require addition removal of sulfur containing compounds.

The refining industry has used several different approaches for removing sulfur from commercially available fuel feedstocks such as gasoline and diesel.

The most common methods employed by the refinery industry for the removal of sulfur from fuels are hydrodesulfurization (HDS), Merox thiol extraction processing, and adsorption.

However, such processes continue to be unable to produce cost effective commercially available fuels that have acceptable levels of sulfur containing compounds.

Moreover, in many cases, the remaining sulfur containing compounds present in commercially available fuels are especially difficult to remove, i.e., mono-alkyl-substituted dibenzothiophenes and, in particular, poly-alkyl-substituted dibenzothiophenes.

As a result, it is now recognized that there is a need for the development of processes and apparatus capable of removing sulfur containing compounds from fuel feedstocks that have already been subjected to sulfur removing processes by the manufacturer of the fuel feedstock, i.e., a refinery and will hereafter be referred to as 'post refinery fuels or feedstocks'. These processes and apparatus employed with regards to post refinery fuels may be referred to as 'sulfur polishing' processes and/or apparatus.

Since post refinery fuel feedstocks have reduced levels of sulfur containing compounds, such sulfur polishing technology must be capable of producing fuels having particularly low concentrations of sulfur containing fuels, i.e., less than 50 ppm and more particularly less than 15 ppm.

In addition, sulfur-polishing technology must be applicable for use in a wide variety of environments without the use of heavy, large, complex and/or expensive equipment, components, pretreatment processes, chemicals, high temperatures and pressures and the like. Ideally, pressures and temperatures would not exceed those normally experienced in an internal combustion engine (ICE) fuel system.

For example, it would be advantageous if sulfur-polishing technology were suitable for use in the normal fuel distribution systems, employed by refineries to distribute their manufactured product. The components of such fuel distribution systems may be generally referred to as interim storage devices, i.e., above and below group storage tanks, tanker trucks, connect piping, metering and dispensing equipment, and the like. It would be desirable to provide sulfur-polishing technology that could be easily and economically utilized by any entity at any point in a fuel distribution system, i.e., refineries, blenders, distributors, processors, direct sellers of fuel and the like.

It would also be especially advantageous if an end user or consumer of a commercially available fuel could readily and easily employ a sulfur polishing technology.

For example, there remains a need for devices, especially fuel filters, which could reduce the amount of sulfur containing compounds in a commercially available fuel stream to a desirable concentration, especially to concentrations of 3 ppm or less. More particularly, there remains a need for such sulfur reducing fuel filters which are economical and capable of consumer-friendly installation and removal with respect to mobile vehicles such as automobiles, trucks, boats, and the like, that utilize internal combustion engines or fuel cells as a power source and for stationary engine applications. Such applications are herein after referred to as on-board vehicle desulfurization or sulfur polishing processes or fuel filters.

It would be especially advantageous to provide on-board vehicle sulfur polishing fuel filters that rely on simple adsorptive sulfur uptake mechanisms that do not require pretreatment of fuel streams directly introduced by a vehicle operator.

Finally, it would be desirable to provide an on-board vehicle desulfurization fuel filter that relies on simple adsorptive sulfur uptake mechanisms but which does not require an adsorbent comprising expensive metal catalyst. Those of skill in the art will appreciate that adsorptive sulfur uptake mechanisms and processes may be distinguished from traditional hydrosulfurization processes. The term "hydrodesulfurization" refers to process that comprise adding hydrogen to a fuel gas, decomposing and converting a sulfur compound into hydrogen sulfide in the presence of a catalyst such as a Co—Mo catalyst, and desulfurizing by adsorption of hydrogen sulfide, which is a decomposition product, by means of a desulfurizing agent such as zinc oxide, iron oxide or the like. Although the hydrodesulfurization process is a reliable process, it is necessary to convert all sulfur compounds into hydrogen sulfide by hydrogenation and heating to about 300 to 400 degree C. In addition, since zinc oxide or iron oxide is used for adsorption and removal, operations become complicated. Accordingly, this process has been employed in a large-scale plant, but is difficult to apply to a small-sized apparatus, especially to on-board vehicle desulfurization fuel filters. In contrast, a process of removing a sulfur compound at normal temperatures by use of an adsorbent needs neither heat or hydrogen as in a hydrodesulfurization process or a thermal adsorption process, and thus, is a simple desulfurization process. It will be appreciated that hydrodesulfurization processes are unsuitable for use as sulfur polishing processes, especially with respect to on board sulfur polishing processes.

As a result, the prior art has failed to satisfy the need for methods and apparatus for removing sulfur containing compounds from post refinery fuels. Although the prior art has attempted to provide devices that remove sulfur-containing fuels from petroleum based streams it has been unable to provide commercially acceptable sulfur polishing technologies.

For example, U.S. Pat. No. 5,454,933 discloses the treatment of a hydrodesulfurized fuel with a solid adsorbent material. Examples of such solid adsorbents include silica gel, activated alumina, zeolites, supported CoMo sorbents, activated coke, and activated carbon.

U.S. Pat. No. 6,533,294 discloses a fuel processing method for the removal of sulfur present in an undiluted oxygenated hydrocarbon fuel which contains an oxygenate and is used to power an internal combustion engine in a mobile environment, such as an automobile or the like, or in a stationary environment.

U.S. Patent Application Publication No. U.S. 2001/0035006 A1 discloses an exhaust gas catalyst comprising: a sulfur trap warm-up catalyst, housed within the exhaust stream and comprising a sulfur scavenger component; and a NOx adsorber catalyst housed within the exhaust stream downstream from said sulfur trap in an underfloor position. The sulfur scavenging component comprises metallic trapping elements including silver, aluminum, barium, cerium, cobalt, copper, zinc, and the like that may be applied to supporting materials such as high surface area materials such as alumina, (including gamma alumina, alpha alumina, theta alumina, and the like) zeolite, zirconia, silica, and the like.

U.S. Patent Application Publication No. U.S. 2002/0028505 A1, the contents of which are incorporated herein by reference thereto, discloses a desulphurization apparatus to be mounted in automobiles, which is arranged between a fuel tank and an injector of an engine, the apparatus comprising a combination of a sulfur-containing compound adsorbent for adsorbing and concentrating the sulfur-containing compound and a sulfur-containing compound oxidizing agent or oxidation catalyst for oxidizing the adsorbed sulfur-containing compound, the apparatus further comprising a means for recovering and removing the resulting sulfur-containing oxide.

SUMMARY OF THE INVENTION

Disclosed are fuel filters and process for removing sulfur-containing compounds from a post refinery fuel stream.

In one embodiment, the disclosed process requires passing the post refinery fuel stream through a fuel filter to provide a clean fuel stream having a reduced concentration of sulfur-containing compounds relative to the post-refinery fuel stream, wherein the fuel filter comprises an adsorbent comprising an inorganic oxide having a surface acidity characterized by a $pK_a$ of less than or equal to −3.

DETAILED DESCRIPTION OF EXEMPLARY EMBODIMENTS

Figure 1:
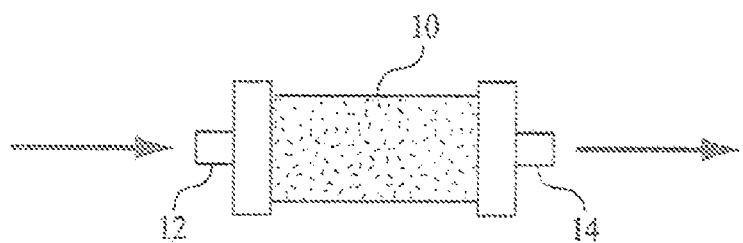
FIG. 1 provides a schematic illustration of one embodiment of the disclosed fuel filter comprising a single column.

Disclosed is a fuel filter that is capable of removing sulfur containing compounds from a post refinery fuel stream.

The term "post refinery fuel stream" or "post refinery fuel" as used herein broadly refers to a fuel or fuel stream (used interchangeably herein) that is manufactured by a petroleum refinery. In one exemplary embodiment, post refinery fuel refers to a fuel manufactured by a petroleum refinery employing at least one sulfur removing technology. In one embodiment, a post refinery fuel stream will comprise sulfur containing compound(s) in a concentration of no more than 2000 ppm. In another embodiment, a post refinery fuel stream will comprise sulfur-containing compound(s) in a concentration of no more than 100 ppm. In one exemplary embodiment, a post refinery fuel stream will comprise sulfur-containing compound in a concentration of no more than 15 ppm. In one embodiment, a post refinery fuel stream contains a population of sulfur species present as various substituted alkyl, benzo, and dibenzothiophenes.

As used herein 'fuel filter' is intended to describe a fuel filter designed to remove sulfur-containing compounds found in fuels. It is understood than in accordance with exemplary embodiments a separate fuel filter may be provided to remove additional contaminants from the fuel (e.g., a typical non-sulfur removing fuel filter). Alternatively, a single fuel filter configured for both removal and release of sulfur-containing compounds and filtering of other contaminants is contemplated to be within the scope of alternative embodiments of the disclosed fuel filters and methods of using the same.

The disclosed fuel filters and methods can be used with power sources such as internal combustion engines and fuel cells employed in both stationary systems and motor vehicles. Alternatively, the disclosed fuel filters and methods can be used at any point or location in traditional fuel distribution systems that distribute post refinery fuel streams to remove sulfur containing compounds that may be undesirably present in a post refinery fuel.

Illustrative examples of internal combustion engines include gasoline powered engines and diesel engines.

The disclosed fuel filters and methods are also generally suitable for use with fuel cells having an anode, a cathode, and an electrolyte in between the two electrodes wherein typically an oxidation reaction (e.g., $H_2 \rightarrow 2H^+ + 2e$) takes place at the anode and a reduction reaction (e.g., $O_2 + 2H_2O + 4OH^-$) takes place at the cathode.

Illustrative examples of fuel cells include Proton Exchange Membrane or Polymer Electrolyte Membrane (PEM) fuel cells, phosphoric acid (PA) fuel cells, molten carbonate (MC) fuel cells, solid oxide (SO) fuel cells, and alkaline fuel cells.

Illustrative examples of stationary systems include generators and power plants.

Illustrative examples of motor vehicles include cars, trucks, boats, personal water craft, semi-trucks, construction devices such as bulldozers and cranes, small engine devices such as lawn mowers and tractors, and the like.

In one embodiment, the fuel filter for removing or reducing the concentration of sulfur containing compounds will be installed on such motor vehicles such that any fuels introduced into the vehicle must pass through the fuel filter before entering the internal combustion engine. In such applications, the fuel filter for removing sulfur-containing compounds, i.e., a sulfur reducing or removing fuel filter may be referred to as an on-board vehicle sulfur polishing or desulfurization component or process.

In one exemplary embodiment, the sulfur removing filter will be used as an on-board vehicle desulfurization component that is part of an emission control system wherein the filter releases captured sulfur containing compounds into the fuel stream during a regeneration process of a NOx adsorber, wherein the regeneration of the NOx adsorber is conducted in accordance with technologies known to those skilled in the related arts.

In addition, the disclosed fuel filters and methods can be used at any point or location in traditional fuel distribution systems that distribute post refinery fuel streams to remove sulfur containing compounds that may be undesirably present in a post refinery fuel.

Such fuel distribution systems may be characterized by (i) a refinery that manufactures the post refinery fuel stream and (ii) one or more interim storage devices. In another embodiment, a fuel distribution system may also include (iii) one or more fuel consuming articles or vehicles having a power source for which consumers introduce fuel. Illustrative examples of interim storage devices include underground and above ground storage tanks, tanker trucks, fuel discharge or dispensing devices, connecting piping, and the like. Fuel consuming articles or vehicles having a power source that consumes fuel include the descriptions above for motor vehicles and stationary systems.

Illustrative post-refinery fuel streams include gasoline, kerosene, heating oil, jet fuel, cracked-gasoline, blends containing 'gas to liquid fuels' derived from natural gas, blends containing 'coal to liquid fuels' derived from coal, biofuels such as ethanol, blends contains biofuels, or diesel fuel. In one exemplary embodiment, the fuel will be diesel fuel.

The term "gasoline" denotes a mixture of hydrocarbons boiling in the range of from about 100.degree. F. to about 400.degree F., or any fraction thereof. Examples of suitable gasoline include, but are not limited to, hydrocarbon streams in refineries such as naphtha, straight-run naphtha, coker naphtha, catalytic gasoline, naphtha, alkylate, isomerate, reformate, and the like and combinations thereof.

The term "cracked-gasoline" denotes a mixture of hydrocarbons boiling in the range of from about 100.degree. F. to about 400.degree. F., or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combustions thereof. Thus, examples of suitable cracked-gasoline include, but are not limited to, coker gasoline, thermally cracked gasoline, fluid catalytically cracked gasoline, heavy oil cracked gasoline, and the like and combinations thereof.

The term "diesel fuel" denotes a mixture of hydrocarbons boiling in the range of from about 300.degree. F. to about 750.degree. F., or any fraction thereof. Examples of suitable diesel fuels include, but are not limited to, light cycle oil, kerosene, jet fuel, straight-run diesel, hydrotreated diesel, and the like and combinations thereof.

The sulfur containing compounds removed by the disclosed fuel filter may in general be any sulfur containing compound normally found in fuels intended for use in internal combustion engines. The disclosed fuel filters may remove one or more of such compounds from a fuel stream.

The term "sulfur" or "sulfur containing compound" denotes sulfur in any form such as elemental sulfur or a sulfur compound normally present in a hydrocarbon-containing fluid such as cracked gasoline or diesel fuel. Examples of sulfur which can be present during a disclosed process, include, but are not limited to, hydrogen sulfide, carbonyl sulfide (COS), carbon disulfide ($CS_2$), mercaptans (RSH), organic sulfides (R-S-R), organic disulfides (R-S-S-R), thiophene, substituted thiophenes, organic trisulfides, organic tetrasulfides, benzothiophene, alkyl thiophenes, alkylated benzothiophenes, dibensothiophenes, alkylated dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

In one exemplary embodiment, the sulfur-containing compounds removed by the disclosed filter or process will be sulfur containing aromatic compounds. In one embodiment, the sulfur containing compounds removed by the disclosed fuel filter include benzothiophene, dibenzothiophene, and derivatives thereof.

In one embodiment, the disclosed fuel filters and methods are suitable for use with the interim storage devices of a traditional fuel distribution system. It will be appreciated that such methods and fuel filters may be employed at numerous locations within such interims storage devices. For example, a fuel desulfurization filter could be incorporated into the dispensing device at the point of use or at the entrance or exit of an interim storage device. In another embodiment, a fuel desulfurization filter could be incorporated at one or more central distribution points.

In yet another embodiment, the disclosed fuel filters and methods may be used to bring post refinery fuels back into compliance. That is, post refinery fuels can become contaminated at any point along the post refinery fuel distribution chain and a once compliant post refinery fuel may thereafter possess levels of sulfur containing compounds outside legally allowed limits. For example, the disclosed fuel filters and methods could be employed in mobile filter trucks that could be used where needed to ensure that a post refinery fuel possesses acceptable levels of sulfur containing compounds.

The disclosed fuel filters are also suitable for use with commercially available post refinery fuels directly inserted into motor vehicles by a vehicle operator through a fuel intake opening in the vehicle. In one exemplary embodiment, the post refinery fuels will be unadulterated, that is, they will not be subject to any pretreatment steps prior to passing through the disclosed fuel filters except for those employed by the original manufacturing refinery. Such fuels may be referred to as unadulturated post refinery fuels.

Fuels or fuel streams that pass through the disclosed fuel filters and methods in any of the foregoing embodiments may be referred to as 'clean fuels' or 'polished fuels'.

In one embodiment, an unfiltered or 'contaminated' post refinery fuel streams may comprise sulfur concentrations of from about 6 ppm to 500 ppm. In another embodiment, the disclosed filters and method may be used with post refinery fuel streams having sulfur concentrations of from about 15 ppm or less. In one exemplary embodiment, the disclosed filters and method may be used with post refinery fuel streams having sulfur concentrations of from about 9 ppm or less. In one embodiment, the disclosed filters and method may be used with refinery fuel streams having sulfur concentrations of from about 6 ppm to about 15 ppm.

In one embodiment, the disclosed method will result in filtered or clean fuel streams having a reduced concentration of sulfur or sulfur containing compounds as compared to the unfiltered or contaminated post refinery fuel. In another embodiment, the disclosed method will result in filtered or clean fuel streams having a reduced concentrations of sulfur or sulfur containing compounds of 15 ppm or less. In another embodiment, the disclosed method will result in filtered or clean fuel streams having a reduced concentrations of sulfur or sulfur containing compounds of 3 ppm or less.

It is an aspect of the disclosed fuel filters that they comprise an adsorbent comprising an inorganic oxide having a surface acidity characterized by a $pK_a$ less than or equal to $-3$. In one embodiment, the adsorbent consisting essentially of an inorganic oxide having a surface acidity characterized by a $pK_a$ of at least $-3$.

The term "inorganic oxide" as used herein refers to porous materials having pores large enough to adsorb sulfur-containing aromatic compounds.

In one embodiment, the inorganic oxides may be characterized by a surface area of at least 50 m$^2$/g, while in another embodiment, the inorganic oxides may be characterized by a surface area of from about 150 m$^2$/g to about 500 m$_2$/g.

In one embodiment, suitable inorganic oxides will have pores in excess of 50 angstroms.

Illustrative examples of suitable inorganic oxides include alumina, kaolinite (either sodium, ammonium or hydrogen forms), montmorillonite (either sodium, ammonium or hydrogen forms), silica magnesia, alumina-boria, activated alumina, zeolites, aluminosilicates, silica gels, clay, active clay, silicon dioxide, mesoporous silica porous material (FSM), silica alumina compounds, silica, alumina phosphate compounds, super acids, super acids-sulfated, titania, sulfated zironia, titanium dioxide, hafnium oxide, and mixtures thereof and the like. In one exemplary embodiment, suitable inorganic oxides will be at least one of alumina, zeolite, silica alumina compounds, silica, alumina phosphate compounds, super acids, silica gels, titanates, zironia, titanium dioxide, hafnium oxide, and mixtures thereof.

In one especially exemplary embodiment, the inorganic oxide will be alumina. The term "alumina" as used herein refers to $Al_2O_3$.

Although many types and phases of alumina are suitable for use in the disclosed fuel filters and methods, in one embodiment, the inorganic oxide will be at least one of gamma alumina, eta alumina, and mixtures thereof.

However, not withstanding the foregoing, only those inorganic oxides having a surface acidity characterized by a $pK_a$ of less than or equal to $-3$ are suitable for use in the disclosed fuel filters and methods.

It will be appreciated that the term "surface acidity" as used herein refers to a surface that has an acidity measurable by visual color change via an acid base indicator such as dicinnamalacetone.

In one embodiment, the disclosed fuel filters will comprise an adsorbent comprising, consisting essentially of, or consisting of, an inorganic oxide having a surface acidity characterized by a $pK_a$ of less than or equal to $-3$. In one embodiment, the disclosed fuel filters will comprise an adsorbent comprising, consisting essentially of, or consisting of, an inorganic oxide having a surface acidity characterized by a $pK_a$ of less than or equal to $-6$. In another embodiment, the disclosed fuel filters will comprise an adsorbent comprising, consisting essentially of, or consisting of, an inorganic oxide having a surface acidity characterized by a $pK_a$ of less than or equal to $-8$. In another embodiment, the disclosed fuel filters will comprise an adsorbent comprising, consisting essentially of, or consisting of an inorganic oxide having a surface acidity characterized by a $pK_a$ of from about $-3$ to about $-8$. It will be appreciated the function of the adsorbent is the adsorption and removal of sulfur-containing compounds from a fuel stream.

Suitable inorganic oxides may be obtained by the calcination of an otherwise suitable inorganic oxide. In one embodiment, otherwise suitable inorganic oxides will be those be inorganic oxides which lack the requisite surface acidity but which are otherwise as described above. In one exemplary embodiment, suitable inorganic oxides will be obtained by the calcination of inorganic oxides which lack the requisite surface acidity but which are otherwise as described above and which are commercially available.

In one embodiment, suitable inorganic oxides will be obtained by heating a commercially available and otherwise suitable inorganic oxide to a temperature of at least 4000° C. In another embodiment, suitable inorganic oxides will be obtained by heating an otherwise suitable and commercially available inorganic oxide to a temperature of from 400 to 800° C. In one exemplary embodiment, suitable inorganic oxides will be obtained by heating an otherwise suitable and commercially available inorganic oxide to a temperature of from 400 to 450° C. under a flow of nitrogen. After preparation, the sorbent may be stored under dry nitrogen until use.

It will be appreciated that the disclosed adsorbents may in one embodiment comprise metals and metal oxides such as Group VIIIA metals, Group IV A, Group IVB and the like.

However, in one embodiment, the disclosed adsorbents may optionally be untreated with any metals or metal oxides other than those discussed above in the context of inorganic oxides. That is, in one embodiment, the disclosed adsorbents will consist essentially of the inorganic oxide having a surface acidity characterized by a $pK_a$ of less than or equal to −3. In another exemplary embodiment, the disclosed adsorbents will consist essentially of an inorganic oxide having a surface acidity characterized by a $pK_a$ of less than or equal to −3 and that is substantially free of the metals and metal oxides traditionally employed as desulfurization catalysts or absorbents. In another exemplary embodiment, the disclosed adsorbents will consist essentially of an inorganic oxide having a surface acidity characterized by a $pK_a$ of less than or equal to −3 and that is substantially free of the metals and metal oxides such as Group VIIIA metals, Group IVA, Group IVB and the like.

In one exemplary embodiment, the fuel filter will comprise less than or equal to one column comprising the disclosed adsorbents. As illustrated in FIG. 1, at least one column 10 will have a first opening 10 through which unfiltered fuel will enter the column 10 and a second opening 14 through which filtered fuel will exit the column 10. During the normal operation of the fuel filter, the concentration of a sulfur-containing compound in the 'clean' fuel exiting the opening 14 will be less than the concentration of the sulfur-containing compound in the 'contaminated' fuel entering the opening 12.

Figure 2:
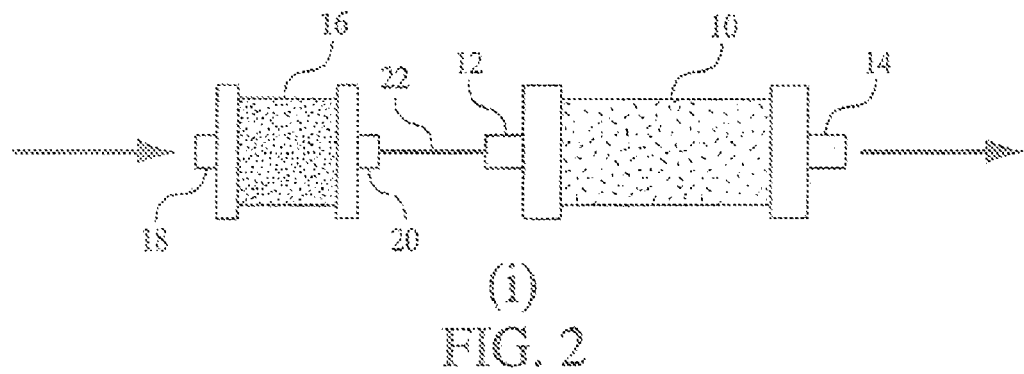
FIG. 2 illustrates another embodiment of the disclosed fuel filter comprising a single column with a guard bed.
Figure 3:
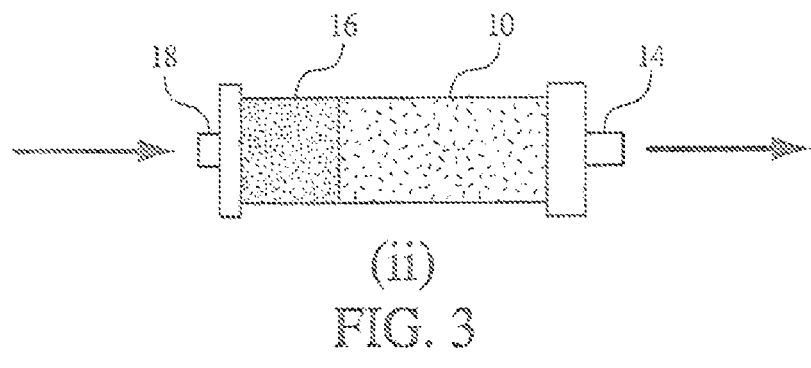
FIG. 3 illustrates an alternative embodiment of the disclosed fuel filter of FIG. 2 comprising a single column with a guard bed.

In another exemplary embodiment, the disclosed fuel filter will further comprise at least one guard bed 16 as illustrated in either FIG. 2 or FIG. 3.

As illustrated in FIG. 2, the at least one guard bed 16 may have a first opening 18 through which fuel enters the guard bed, and a second opening 20 through which fuel exits the guard bed. In this embodiment, the guard bed 16 will connected to the at least one column 10 via a hollow conduit 22 through which fuel may pass and be transferred.

Alternatively, in another embodiment as illustrated in FIG. 3, the at least one guard bed 16 may be contiguously attached to column 10 such that fuel enters through a first opening 16, passes through both the guard bed 16 and the column 10, and subsequently exits through the second opening 14 of column 10.

Figure 4:
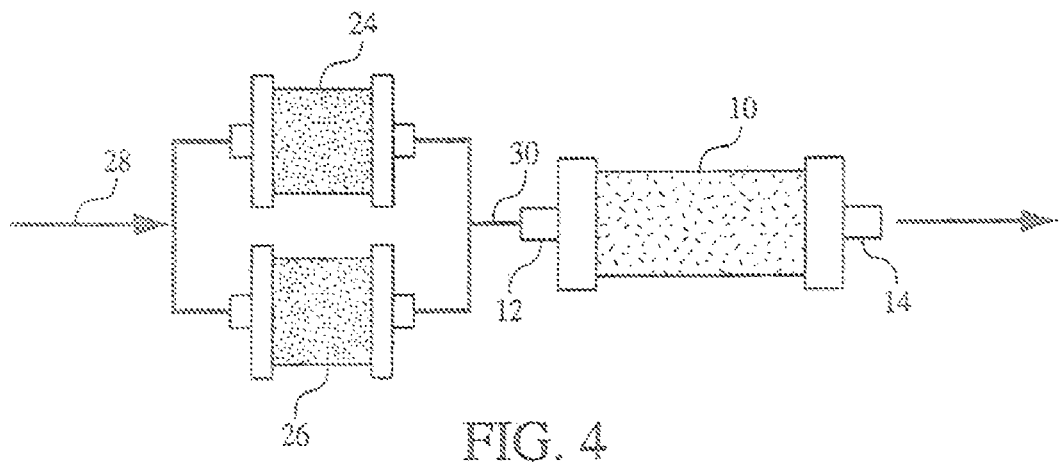
FIG. 4 provides a schematic illustration of another embodiment of the disclosed fuel filter comprising a single column with dual guard beds.

In another embodiment illustrated in FIG. 4, the disclosed fuel filter may comprise at least one column 10 that is linked to two guard beds 24 and 26 via conduits 28 and 30. In this embodiment, the incoming fuel may enter one or both of the guard beds 24 and 26. After exiting from one or both of guard beds 24 and 26, the fuel will be transferred to column 10 via conduit 30. In this embodiment, the fuel entering the column 10 will pass through first opening 12 and exit column 10 via second opening 14.

Figure 5:
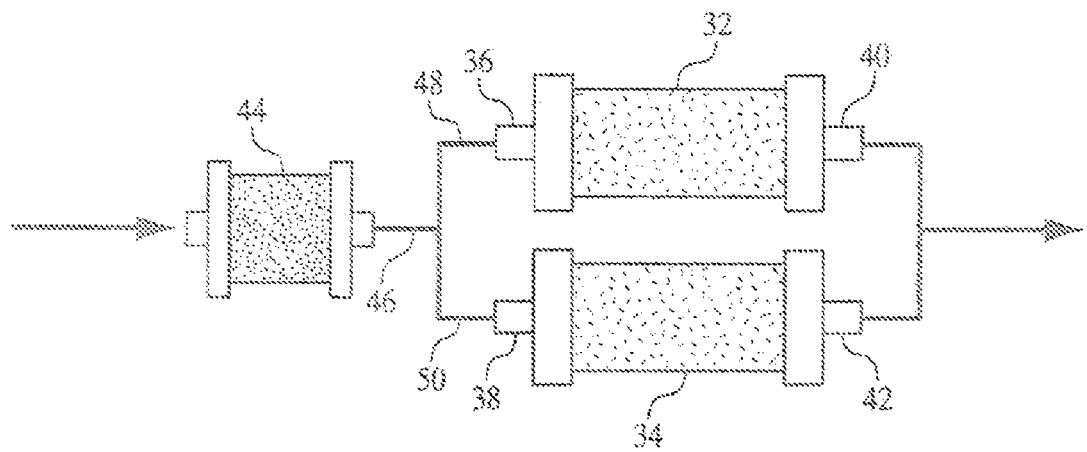
FIG. 5 provides a schematic illustration of yet another embodiment of the disclosed fuel filter comprising dual columns with a single guard bed.

In another embodiment illustrated in FIG. 5, the fuel filter may comprise multiple or dual columns 32 and 34 and a multiple or single guard bed 44. Dual columns 32 and 34 respectively have first openings 36 and 38 through which fuel may enter, and second openings 40 and 42 through which fuel may exit. Single guard bed 44 is connected to dual columns 32 and 34 via conduit 46. Conduit 46 in one embodiment will have conduits 48 and 50 arrayed such that fuel may enter one or both of columns 32 and 34, either sequentially or simultaneously.

Figure 6:
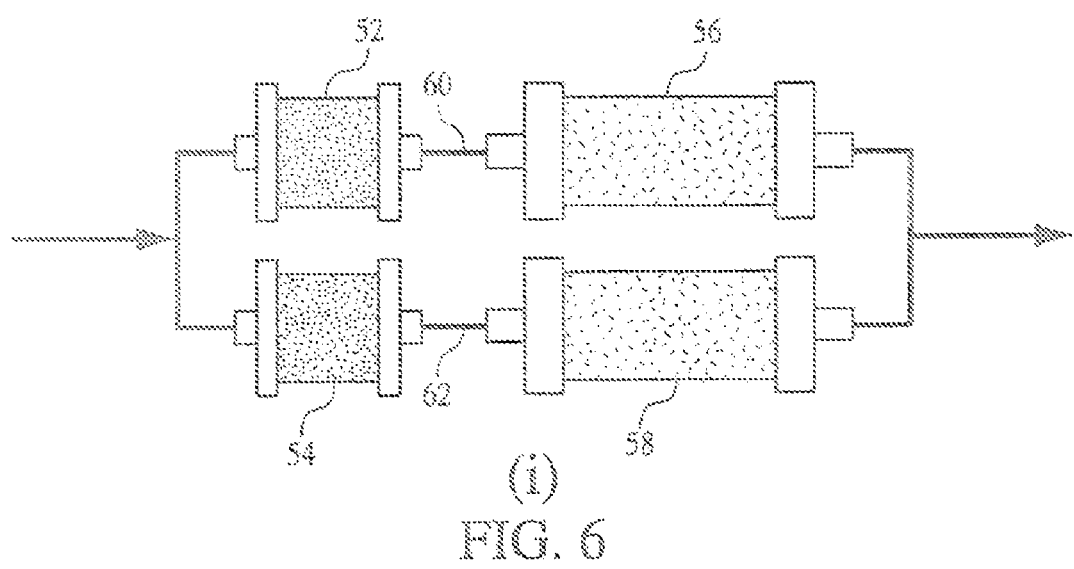
FIG. 6 provides a schematic illustration of another embodiment of the disclosed fuel filter comprising dual columns with dual guard beds.
Figure 7:
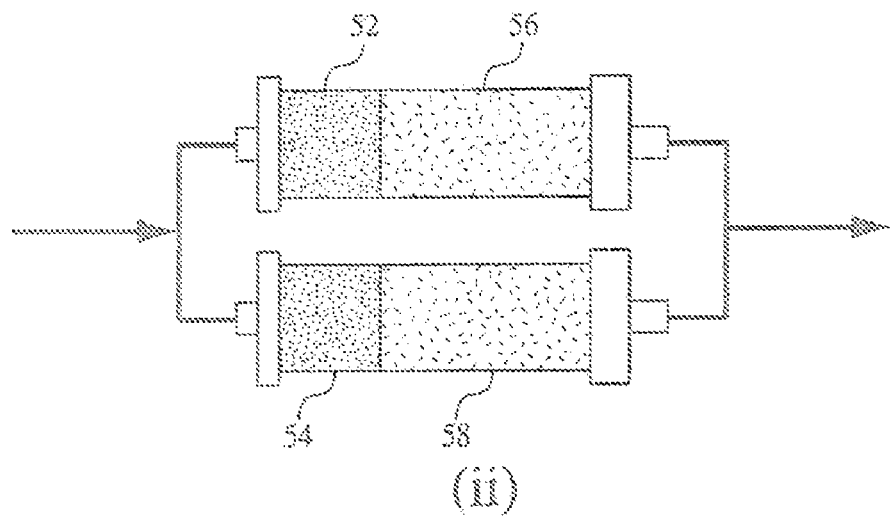
FIG. 7 illustrates an alternative embodiment of the disclosed fuel filter of FIG. 6 comprising dual columns with dual guard beds.

Finally, as illustrated in FIGS. 6 and 7, the disclosed fuel filter may comprise two guard beds 52 and 54 and two columns 56 and 58. As discussed above with regard to the embodiment of FIG. 2, the guard beds 52 and 54 may be respectively connected to columns 56 and 58 via conduits 60 and 62. Alternatively, the guard beds 52 and 54 may be directly attached to columns 56 and 58 without the use of any hollow conduits. As discussed above with regard to FIGS. 4 and 5, the fuel may enter one or both of the guard beds 52 and 54 as well as one or both of columns 56 and 58.

In addition to the disclosed fuel filter, the invention also provides a method for removing a sulfur-containing compound from a post refinery fuel stream. The disclosed method comprises removing a sulfur-containing compound from a fuel by passing the fuel through the disclosed fuel filters capable of removing a sulfur containing compound.

In another embodiment, the disclosed methods and processes may further comprise storing the removed sulfur containing compound, releasing a portion of the stored sulfur-containing compound, and sending the portion to an emission control device.

A sulfur-containing compound is removed from a fuel stream as the fuel is passed through the disclosed fuel filters. In one exemplary embodiment, the sulfur-containing compound is removed as the fuel is passed through at least one column comprising the disclosed adsorbents as discussed above.

In one embodiment, the sulfur-containing compound removed from a fuel stream by the disclosed fuel filter will be stored by the fuel filter. In one exemplary embodiment, the removed sulfur containing compound will be stored in the at least one column comprising the disclosed adsorbent. In one especially exemplary embodiment, the removed sulfur-containing compound will be stored in the disclosed adsorbent.

Figure 10:
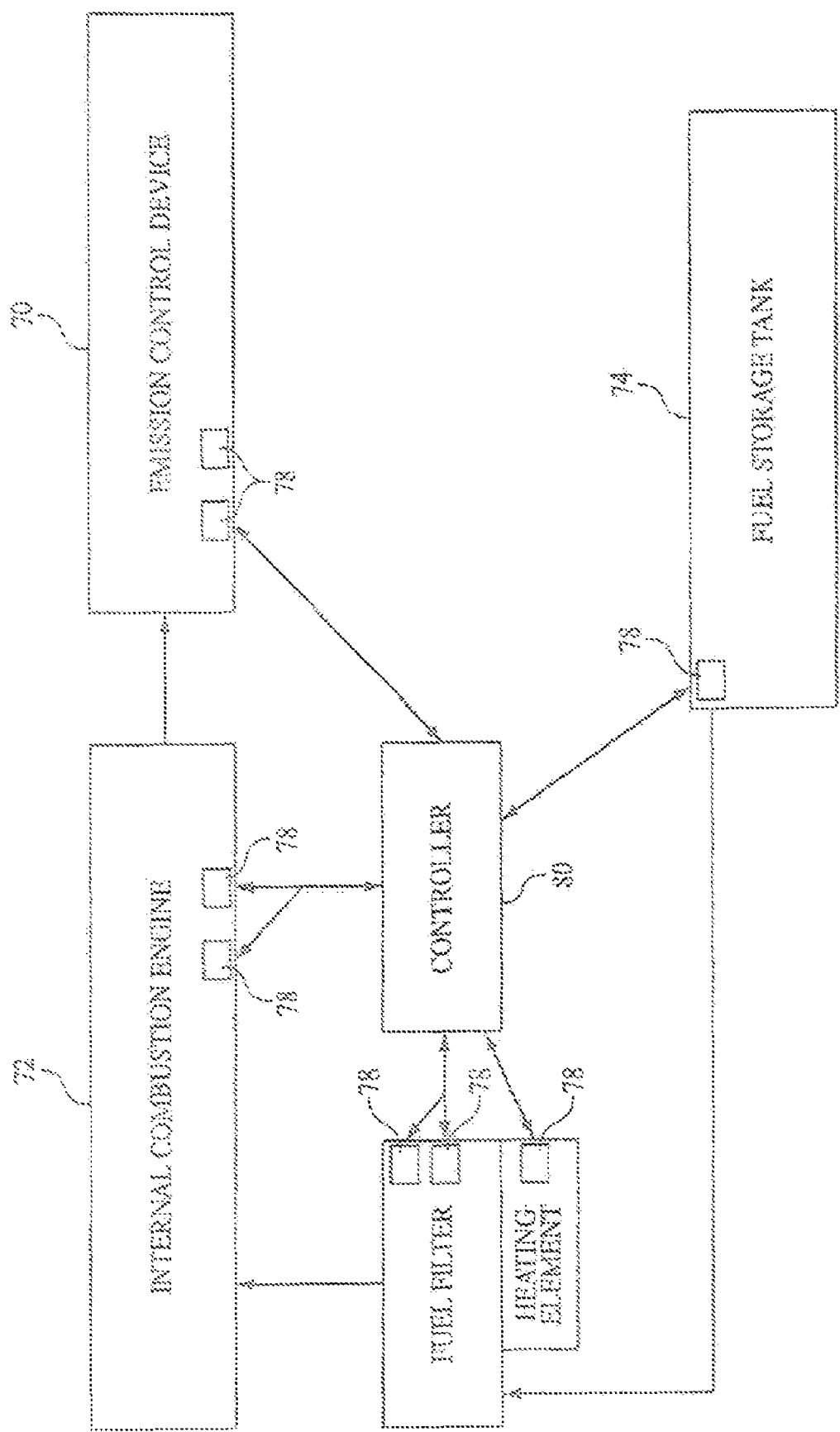
FIG. 10 is a schematic illustration of an internal combustion engine and NOx adsorber with a disclosed fuel filter.

It will be appreciated that over the life of an internal combustion engine the disclosed fuel filter will remove a quantity of sulfur containing compounds. In one embodiment, at some point, the adsorbent may become incapable of storing any additional sulfur-containing compound even though additional storage is desired. At such a point, the disclosed fuel filter may be regenerated. Non-limiting examples of determining when the fuel filter has become saturated with sulfur-containing compounds are: measuring via sensors the sulfur content of the fuel before and after the fuel filter wherein sulfur measurement equal to or close to those of measurement entering the filter will indicate that the filter is no longer removing sulfur from the fuel; providing sensors to determine how much sulfur the engine is putting out in the exhaust stream; providing sensors in the fuel storage tank to determine the base line in parts per million of the sulfur in the fuel of the vehicle; and providing pressure sensors before and after the fuel filter, wherein any of the aforementioned methods are facilitated through the microprocessor or controller and various sensors communicating therewith as illustrated in FIG. 10. Regeneration of the fuel filter as used herein refers to the release of at least a portion of the stored sulfur-containing compound, i.e., desulfation. Such release or regeneration may be accomplished by one or more methods.

In one exemplary embodiment, the regeneration of the fuel filter may be accomplished by heating the fuel filter to an elevated temperature. In one embodiment, at least one column of the fuel filter will be heated by a heating element (illustrated in FIG. 10) wherein either the adsorbent member of the fuel filter, the fuel or both are heated to a temperature that is greater than the highest normal operating temperature of the fuel stream, wherein the captured sulfur containing compounds will be released into the fuel stream. In one exemplary embodiment, the heating element is a resistive type-heating element wherein an applied current or voltage from a power supply is used to increase the temperature of the fuel or the adsorbent material in order to release the captured sulfur containing compounds. Of course, other equivalent heating devices are contemplated for use in exemplary embodiments of the present invention. In one exemplary embodiment, at least one column of the fuel filter will be heated to a temperature that is equal to or greater than about 100° C. In another embodiment, the at least one column of the fuel filter will be heated to a temperature that is equal to or below the boiling point of the fuel.

In another embodiment, the fuel filter may be regenerated by the use of a heated fuel stream or by displacement by a solvent other than the fuel, wherein the solvent is released from a solvent reservoir in fluid communication with the fuel stream and is capable of releasing the captured sulfur containing compounds from the adsorbent member. In one exemplary embodiment the solvent is released from the reservoir and then recaptured by a suitable filter or alternatively the solvent is a material capable of being consumed by the internal combustion engine without damaging the same or the associated emission control devices.

The portion of the stored sulfur-containing compound released by the regeneration of the fuel filter is sent through an internal combustion engine and into an emission control device, especially a post-combustion emission control device. Emission control device as used herein refers to nitrogen oxide or 'NOx' adsorbers used to remove nitrogen oxides from the exhaust streams of both mobile and stationary internal combustion engines. In one embodiment, the emission control device will be a Lean NOx Trap or LNT. 'Post-combustion' refers to a device positioned to receive the products of combustion from an internal combustion engine, i.e., located downstream from the internal combustion engine.

In one exemplary embodiment, the released portion will be sent through the engine and into the emission control device so that it enters the emission control device at a time or operation in the device's operational cycle when the effect of the increased concentration of sulfur is minimized.

In another embodiment, the portion may be sent through the engine and into a post combustion emission device such as a NOx adsorber at a time during its cycle that is less sensitive to high sulfur levels. In a more preferred embodiment, the portion of sulfur containing compound released by the regeneration of the disclosed fuel filter will be sent to a NOx adsorber at a time when the NOx adsorber and/or NOx adsorber catalyst is undergoing a regenerative process either for NOx or desulfation.

The catalysis in NOx adsorbers typically undergo regenerative processes designed to increase the efficiency of the catalyst/NOx adsorber. A first type of regenerative process is designed to convert the nitrogen oxides to nitrogen. In a second type of regenerative process, contaminants such as sulfur containing compounds are driven off. The later process is sometimes referred to as desulfation and typically occurs at higher temperatures.

In one exemplary embodiment, the portion of the sulfur containing compound released by the regeneration of the disclosed fuel filter will be sent to a NOx adsorber at a time when the NOx adsorber and/or NOx adsorber catalyst is undergoing a regenerative process that results in the removal or release of nitrous oxides via reduction.

In another embodiment, the portion of the sulfur containing compound released by the regeneration of the disclosed fuel filter will be sent to a NOx adsorber at a time when the NOx adsorber and/or NOx adsorber catalyst is undergoing a regenerative process that results in the liberation of the sulfur containing compounds, i.e., desulfation.

In one exemplary embodiment the release of the portion and its sending to an emission control device will occur over a short period of time relative to the regeneration period of the fuel filter. In one exemplary embodiment, the regeneration period of the fuel filter approximates the regeneration period of the emission control device. In accordance with exemplary embodiments of the present invention, the regeneration period of the emission control device will be maximized as the fuel filter will reduce the amount of sulfur being deposited on the NOx adsorber thus, regeneration periods can be less frequent and at longer intervals.

Also disclosed herein is a method and apparatus for extending the life cycle of an emission control device 70 in fluid communication with the exhaust of an internal combustion engine 72. This apparatus or system includes the disclosed fuel filter for removing and storing sulfur-containing compounds from a post refinery fuel stream is illustrated schematically in FIG. 10. As illustrated, the internal combustion engine receives fuel from a fuel storage tank 74 via the fuel filter. A non-limiting example of an apparatus, method or means for monitoring and controlling the release of stored sulfur containing compounds into the fuel stream is illustrated in FIG. 10.

In one embodiment, the emission control device is a post combustion emission control device that receives the gaseous products of combustion from the combustion chamber of the internal combustion engine.

In one exemplary embodiment, the apparatus, method or means for monitoring and controlling the release of stored sulfur containing compounds is an on-board control apparatus comprising a plurality of sensors 78 each providing signals to a microprocessor or controller 80 comprising programmable logic that is configured to receive signals from the plurality of sensors and provide signals to the fuel filter and its associated heater element, the internal combustion engine, fuel delivery and ignition systems to vary the air to fuel flow mixture, if necessary (e.g., lean or rich operation to increase exhaust temperature) and heater elements of the emission control device wherein and upon receipt of the appropriate signals (e.g., fuel filter sulfur capacity reached and emission control device operating in or at a desulfurization or regeneration mode) the microprocessor will instruct the release of the sulfur into the fuel stream wherein the same can be received by the emission control device without adversely affecting the same.

It is understood that a controller operating in response to a computer program may implement the processing of the above description. In order to perform the prescribed functions and desired processing, as well as the computations therefore, the controller may include, but not be limited to, a processor(s), computer(s), memory, storage, register(s), timing, interrupt(s), communication interfaces, and input/output signal interfaces, as well as combinations comprising at least one of the foregoing.

As described above, algorithms for implementing exemplary embodiments of the present invention can be embodied in the form of computer-implemented processes and apparatuses for practicing those processes. The algorithms can also be embodied in the form of computer program code containing instructions embodied in tangible media, such as floppy diskettes, CD-ROMs, hard drives, or any other computer-readable storage medium, wherein, when the computer program code is loaded into and executed by a computer and/or controller, the computer becomes an apparatus for practicing the invention. Existing systems having reprogrammable storage (e.g., flash memory) that can be updated to implement various aspects of command code, the algorithms can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer. When implemented on a general-purpose microprocessor, the computer program code segments configure the microprocessor to create specific logic circuits.

These instructions may reside, for example, in RAM of the computer or controller. Alternatively, the instructions may be contained on a data storage device with a computer readable medium, such as a computer diskette. Or, the instructions may be stored on a magnetic tape, conventional hard disk drive, electronic read-only memory, optical storage device, or other appropriate data storage device. In an illustrative embodiment of the invention, the computer-executable instructions may be lines of compiled C++ compatible code.

In an exemplary embodiment the controller includes logic for evaluating signals from the plurality of sensors to determine if the sulfur from the fuel filter is to be released into the fuel stream during a desulfurization or regeneration process of the emission control device. In one non-limiting embodiment, a means for controlling the release of the sulfur will comprise a circuit and sensor for identifying a predetermined temperature or pressure in either the engine or the emission control device that signals the appropriate time for release.

It will be appreciated throughout this discussion that the singular forms "a", "an" and "the" include plural referents unless the context clearly dictates otherwise. Similarly, throughout "optional" or "optionally" means that the subsequently described event or circumstance may or may not occur, and that the description includes instances where the event occurs and instances where it does not. Likewise, the modifier "about" used in connection with a quantity is inclusive of the stated value and has the meaning dictated by the context (e.g., includes the degree of error associated with measurement of the particular quantity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

EXAMPLES

Example 1

Correlation of Surface Acidity of Various Refractory Inorganic Oxides with Sulfur Removal A visual color change method was used to assess the surface acidity of a number of inorganic oxides, including those with high as well as low sulfur capacity. Supports tested included the following adsorbents or sorbents:

Alumina 1—pretreated 450° C./N2
Alumina 1—pretreated 160° C.
Alcoa Selexsorb CDX—pretreated 450° C./N2
Gamma Alumina (Brockmann's)—pretreated 450° C./N2
Merck Silica, 40 A—pretreated 160° C./N2
Y-H+ Zeolite—pretreated 450° C./Air
Alumina 1—no pretreatment.

The materials treated as above were then exposed to a series of indicator dyes that turn color at specific acid strengths (pKa values):

| 9,10-Anthraquinone- | pKa = ~8.2 Most Acid Color Change |
| Dicinnamalacetone- | pKa = ~3.0 |
| Methyl Yellow- | pKa = +3.3 |
| Methyl Red- | pKa = +4.8 |

The most acidic dye indicator (9,10-Anthraquinone) turns from colorless to a bright yellow if the acid strength is at least about that of sulfuric acid.

Figure 8:
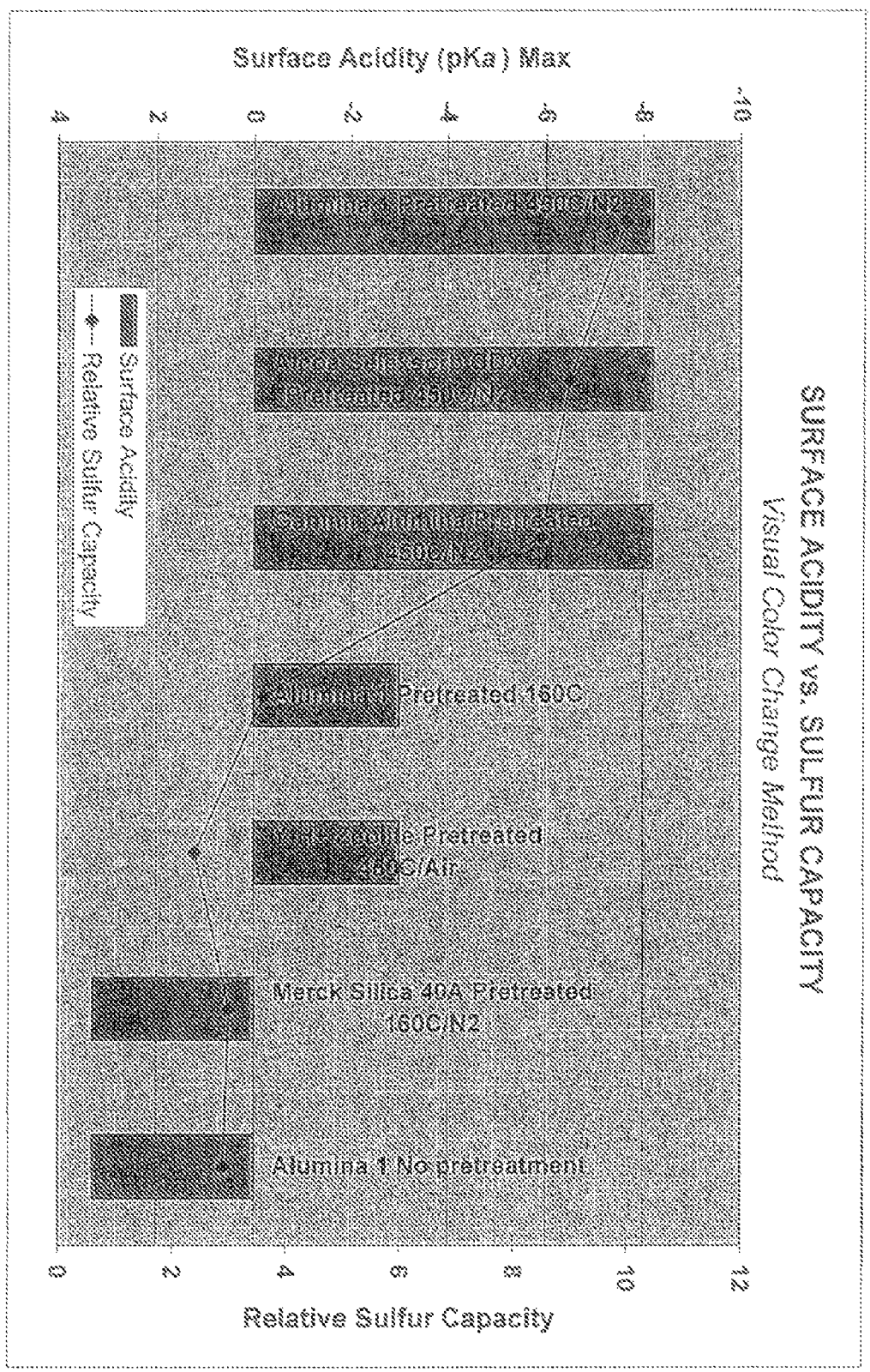
FIG. 8 illustrates the correlation between surface acidity as measured by the visual color change method and sulfur removal capacity.

The results and the correlation to sulfur removal capacity are set forth in FIG. 8. The semi-quantitative surface acidity values are chosen on the left Y-axis, and the bar height corresponds to surface acidity as measured using the dye indicators. The values plotted represent the minimum acidity, since no dye indicators were available to assess acidity more strong than a pKa of −8.2. The right Y-axis (blue line) indicates the relative sulfur capacity as determined using the stirred reactor sulfur uptake protocol employed in Example 2 below. These data show a good correlation between surface acidity and sulfur capacity, with the exception of the Y-H$^+$ zeolite. The surface acidity of this material might indicate a higher sulfur capacity than actually measured, and it is thought that the relatively small pore size of the zeolite (~8 Å) might hinder uptake of the bulky DMDBT-class of compounds.

Example 2

Correlation of Surface Acidity of η-Alumina with Sulfur Removal from ULSD

Three grams of η-alumina were calcined overnight at 450° C. in a stream of nitrogen gas flowing at 0.35 L/min. The calcined alumina was divided among four glass dishes, and each dish was placed in a 1-Liter jar that contained a different desiccant. The desiccants used were magnesium sulfate, calcium chloride, calcium sulfate, and phosphorus pentoxide. The calcined alumina was allowed to equilibrate at the four hydration levels for 24 hours.

The surface acidity of the η-alumina was determined using the procedure found in Benesi, H. A., J. Am. Chem. Soc., 1956, 78, 5490-5494. The indicators used in this work were methyl red, methyl yellow, crystal violet, dicinnamalacetone, and anthraquinones. Solutions of the colorimetric indicators were prepared by dissolving 3 mg of the indicator in 15 mL of cyclohexane. In some cases the solid indicator did not completely dissolve in the cyclohexane. The calcined alumina in the different humidity levels was tested for its surface acidity by adding 0.2 g of hydrated alumina to 2 mL of the indicator solution. The color change was noted and correlated with the pKa of the indicator.

The extent of the sulfur removal of the alumina at each hydration level was measured using a static uptake procedure. The alumina (0.15 g) was added to a vial containing 15 mL of ultra-low sulfur diesel fuel (ULSD). The mixture was stirred for 19 hours while it was heated to 60° C. After 19 hours, the stirring was stopped and the solids settled to the bottom of the vial. A portion of the diesel fuel was removed and analyzed for sulfur using an Antek Model 9000VLLS analyzer.

Figure 9:
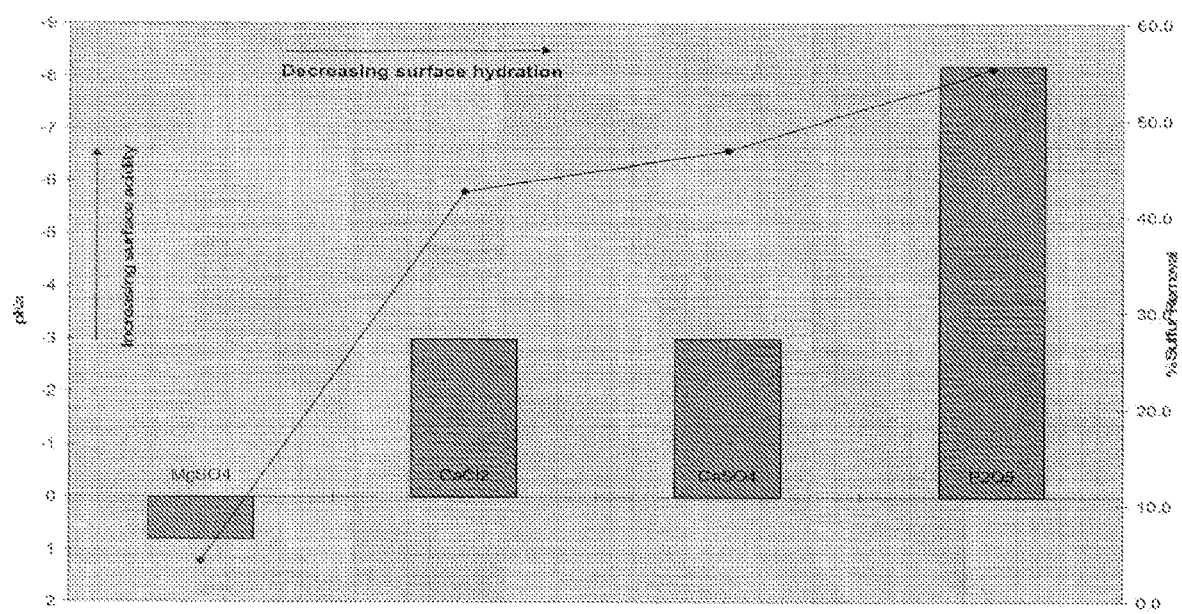
FIG. 9 illustrates the effect of varying surface acidity upon the sulfur removal capacity of a single refractory inorganic oxide.

The surface acidity of the η-alumina at the various hydration levels is correlated with the sulfur removal of the η-alumina in FIG. 9. It can be seen that increasing the surface acidity of the inorganic oxide increases the ability of the adsorbent to remove sulfur containing compounds from a fuel.

What is claimed is:

1. A method for removing a sulfur containing compound from a post refinery fuel stream, comprising
passing the post refinery fuel stream through a fuel filter comprising adsorbent comprising an inorganic oxide having a surface acidity characterized by a $pK_a$ of less than or equal to −3.

2. An on-board vehicle method for removing sulfur-containing compounds from a post refinery fuel stream, comprising:
passing the post refinery fuel stream through a fuel filter in fluid communication with the power source to provide a clean fuel stream,
wherein the fuel filter comprises an adsorbent comprising an inorganic oxide having a surface acidity characterized by a $pK_a$ of less than or equal to −3.

3. The on-board vehicle method of claim 2 wherein the post refinery fuel stream comprises sulfur containing compound in an amount of no more than 100 ppm.

4. The on-board vehicle method of claim 3 wherein the post refinery fuel stream comprises sulfur containing compound in an amount of no more than 15 ppm.

5. The on-board vehicle method of claim 2 wherein the clean fuel stream comprises sulfur containing compound in an amount of no more than 3 ppm.

6. A fuel filter comprising an adsorbent comprising an inorganic oxide having a surface acidity characterized by a $pK_a$ of less than or equal to −3 wherein the inorganic oxide is at least one of alumina, kaolinite (either sodium, ammonium or hydrogen forms), montmorillonite (either sodium, ammonium or hydrogen forms), silica magnesia, alumina-boria, activated alumina, zeolites, aluminosilicates, silica gels, clay, active clay, silicon dioxide, mesoporous silica porous material (FSM), silica alumina compounds, silica, alumina phosphate compounds, super acids, super acids-sulfated, titania, sulfated zirconia, titanium dioxide, hafnium oxide, and mixtures thereof.

7. The fuel filter of claim 6 wherein the surface acidity of the inorganic oxide is attributable to Lewis acids.

8. The fuel filter of claim 7 wherein the adsorbent consists essentially of the inorganic oxide having a surface acidity characterized by a $pK_a$ of less than or equal to −3.

9. The fuel filter of claim 8 wherein the inorganic oxide is characterized by a surface that is substantially free of applied compounds comprising Group VIIIA metals, Group IV metals, alkali metals, alkaline earth metals, and mixtures thereof.

10. The fuel filter of claim 8 wherein the inorganic oxide is substantially free of compounds comprising Group VIIIA metals, alkali metals, alkaline earth metals, and mixtures thereof.

11. The fuel filter of claim 6 wherein the inorganic oxide consists essentially of alumina.

12. The fuel filter of claim 11 wherein the inorganic oxide consists essentially of gamma, eta, or chi alumina.

13. The fuel filter of claim 6 wherein the inorganic oxide has a surface acidity characterized by a $pK_a$ of less than or equal to −6.

14. The fuel filter of claim 13 wherein the inorganic oxide has a surface acidity characterized by a $pK_a$ of less than or equal to −8.

15. An on-board vehicle sulfur polishing fuel filter in fluid communication with and located between a fuel intake opening and a power source, the fuel filter comprising an inorganic oxide having a surface acidity characterized by a $pK_a$ of less than or equal to −3.

16. The on-board vehicle sulfur polishing fuel filter of claim 15 wherein the power source is a fuel cell.

17. The on-board vehicle sulfur polishing fuel filter of claim 15 wherein the power source is an internal combustion engine.

18. A process for regulating sulfur containing compounds in a post refinery fuel stream within a fuel distribution system having (i) a refinery that manufacturers the post refinery fuel stream; and (ii) one or more interim storage devices; the process comprising:
passing the post refinery fuel stream through a fuel filter located in an interim storage device, the fuel filter comprising an inorganic oxide having a surface acidity characterized by a $pK_a$ of less than or equal to -3.

19. The process of claim 18 wherein the fuel distribution system further comprises one or more fuel consuming articles.

20. The process of claim 19 wherein the fuel consuming articles is at least one of a stationary system or a motor vehicle.

21. The process of claim 18 wherein the interim storage device is at least one of an above ground fuel storage tank, an underground fuel storage tank, a fuel tanker truck, a filter truck, or a fuel dispensing device.

22. An apparatus for extending the life cycle of a post combustion emission control device comprising:
a fuel filter comprising an adsorbent comprising an inorganic oxide having a surface acidity characterized by a $pK_a$ of less than or equal to −3,
an internal combustion engine,
a post combustion emission control device, and
a hollow conduit connecting the filter, the engine and the emission control device.

* * * * *